Feb. 7, 1933.   J. J. BONACCORSI   1,896,537
ELECTRIC SMOKELESS ROASTER
Filed June 19, 1931   3 Sheets-Sheet 1

Joseph John Bonaccorsi
INVENTOR
BY Victor J. Evans and Co. ATTORNEY

Feb. 7, 1933. J. J. BONACCORSI 1,896,537
ELECTRIC SMOKELESS ROASTER
Filed June 19, 1931 3 Sheets-Sheet 2

Joseph John Bonaccorsi
INVENTOR
BY Victor J. Evans
and Co. ATTORNEY

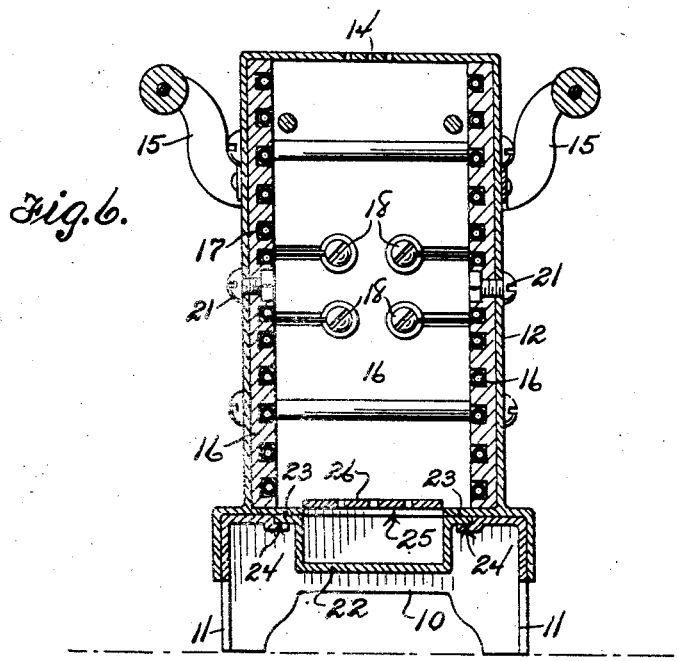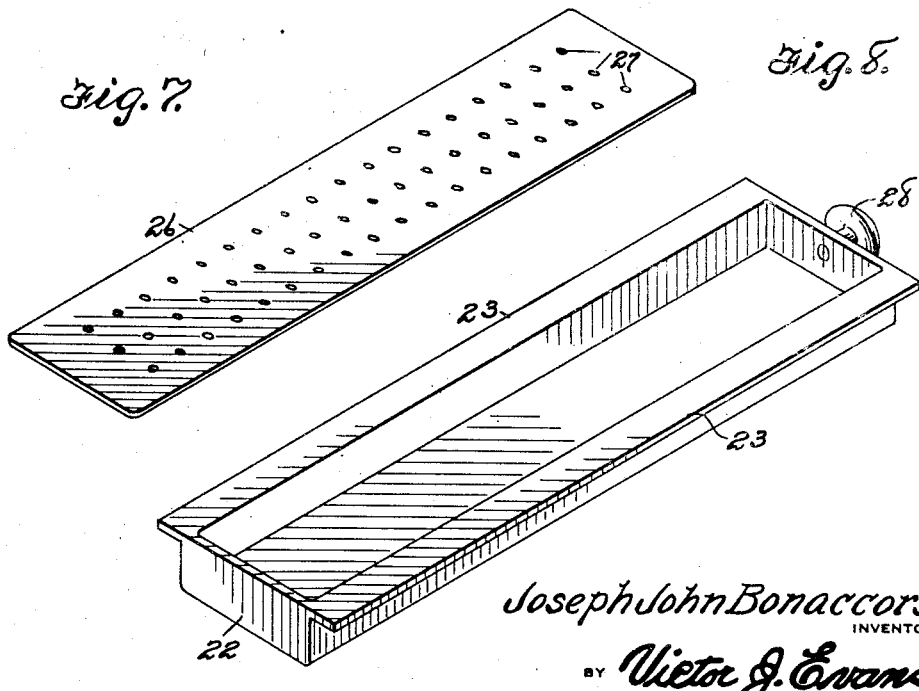

Patented Feb. 7, 1933

1,896,537

UNITED STATES PATENT OFFICE

JOSEPH JOHN BONACCORSI, OF NEW YORK, N. Y., ASSIGNOR, BY MESNE ASSIGNMENTS, OF ONE-HALF TO SANTO SALAMONE, OF NEW YORK, N. Y.

ELECTRIC SMOKELESS ROASTER

Application filed June 19, 1931. Serial No. 545,540.

The invention relates to a roaster and more especially to an electric smokeless roaster.

The primary object of the invention is the provision of a roaster of this character whereby in a steak or other meat sliced can be readily and conveniently placed therein and when within the same both sides of the piece of meat will be roasted simultaneously and the drippings or juice will be trapped during the roasting operation, the roaster being of novel construction.

Another object of the invention is the provision of a roaster of this character wherein heat units are disposed in opposed relation to each other and spaced apart to accommodate therebetween a piece of meat or other matter to be roasted so that quick roasting action can be had and also the piece of meat roasted simultaneously on both sides thereof, the heating units being arranged in a novel manner and are of electrical kind, the roaster being readily portable and can be electrically connected with a house wiring system for the use thereof.

A further object of the invention is the provision of a roaster of this character which is extremely simple in construction, light in weight yet strong, durable, thoroughly reliable and efficient in its purpose, neat and attractive in appearance and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 6 is a sectional view on the line 6—6 of Figure 1 looking in the direction of the arrows.

Figure 7 is a perspective view of the cover plate for a drip tray or receptacle.

Figure 8 is a perspective view of the drip tray or receptacle.

Figure 9 is a perspective view of a roasting frame for holding a sliced piece of meat or the like.

Similar reference characters indicate corresponding parts throughout the several views in the drawings.

Figure 1:
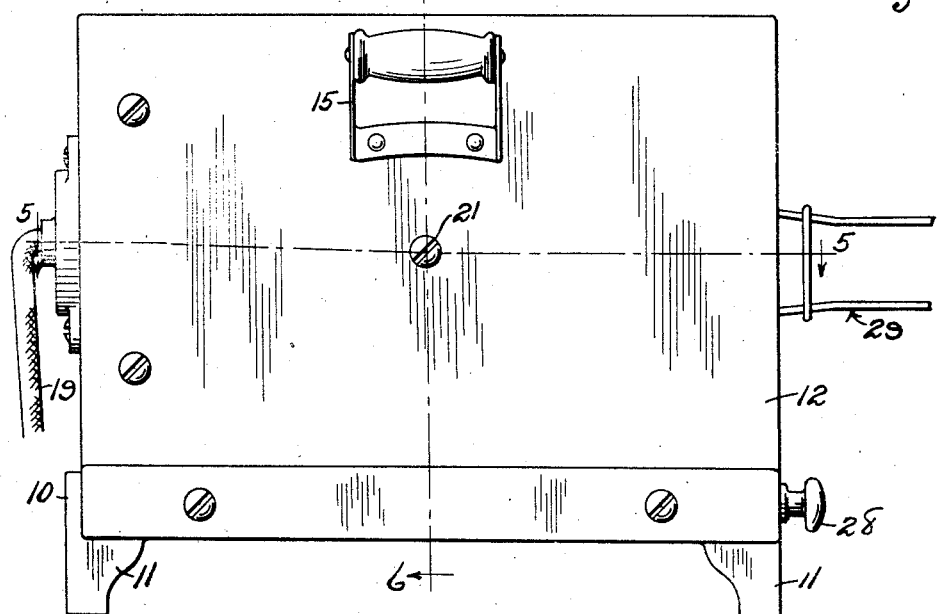
Figure 1 is a side elevation of a roaster constructed in accordance with the invention.
Figures 2, 3:
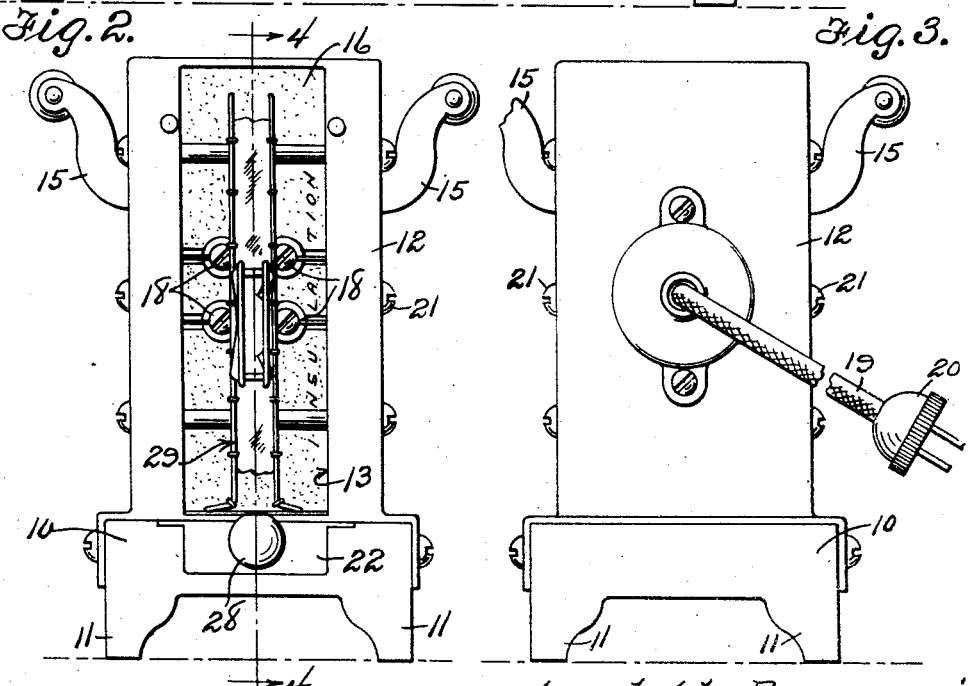
Figure 2 is a front elevation.
Figure 3 is a rear elevation.
Figure 4:
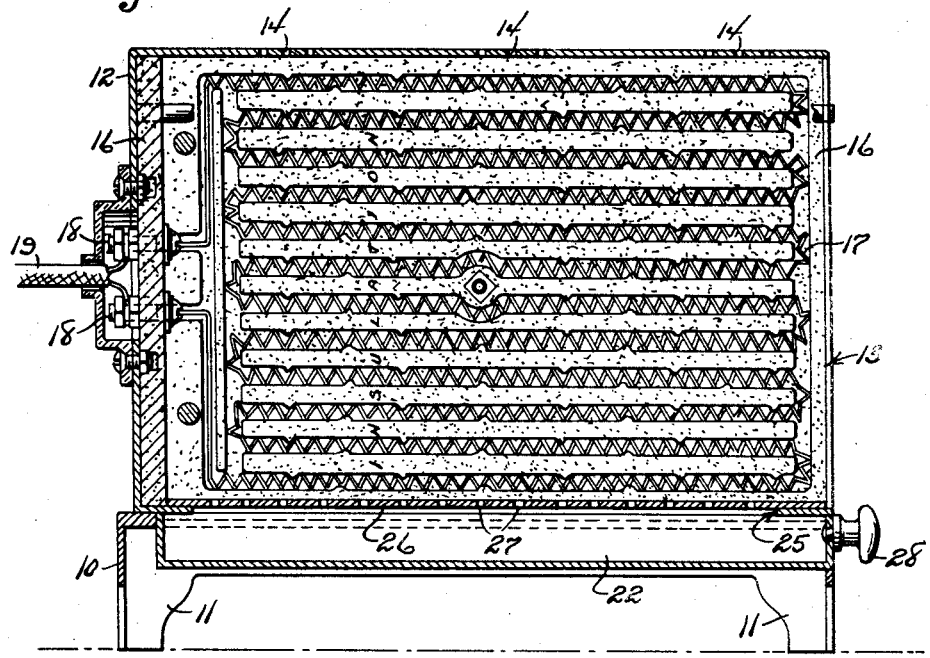
Figure 4 is a sectional view on the line 4—4 of Figure 2 looking in the direction of the arrows.
Figure 5:
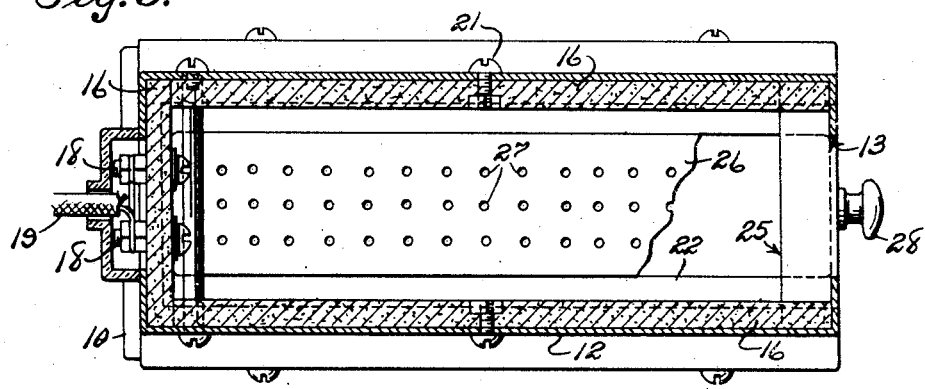
Figure 5 is a sectional view on the line 5—5 of Figure 1 looking in the direction of the arrows.
Figure 9:
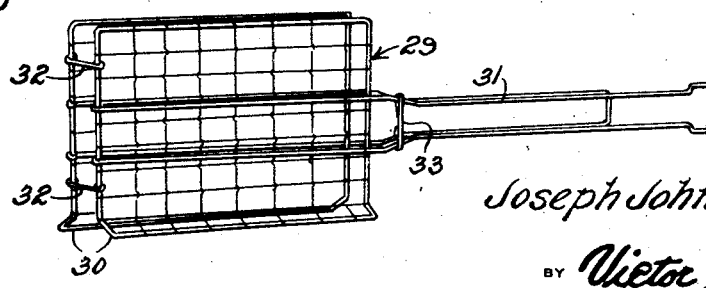

Referring to the drawings in detail, the roaster comprises a base 10 preferably made from sheet metal having corner supporting legs 11 which elevate the base the required distance from a table or other supporting foundation and from this base rises a casing 12, preferably made from sheet metal closed at opposite sides, top and one end, while the front is open as at 13, the top being formed with vents or perforations 14. The sides of the casing 12 centrally thereof near the top are fitted with handles 15 to enable the broiler to be conveniently carried from one place to another and thus the same being readily portable.

Arranged within the casing 12 against opposite sides thereof and also at the closed rear end is a slab-like insulation 16 and within this at opposite sides of the casing are electric heating coils or units 17, these through the medium of the terminal post 18 are connected with an electric current conductor 19 having a socket plug 20 for hooking into a house current circuit for the operation of the coils or units 17 as will be understood. The insulation 16 is preferably made fast to the inner faces of the casing 12 covered thereby through the medium of fasteners 21. Arranged removable from the base 10 is a drip tray or receptacle 22, the latter having side ledges or flanges 23 for engaging in guides 24 arranged on the base 10 so that this tray or receptacle can be slidably fitted with the base 10 which is cut away at 25 at its portion confronting the tray or receptacle and such cut away portion has a cover plate 26 thereover for the tray or receptacle 22, the cover plate being reticulated or perforated as at 27 to permit drippings from a piece of meat or the like when being roasted to drop into the tray or receptacle 22 during the use of the roaster. The tray or receptacle 22 at its outer end is provided with a hand knob 28 to permit the manual sliding of the same out of or into a roaster as will be obvious.

Removably insertable through the front opening 12 between the heating units 17 is a meat slice holding frame or roaster frame 29, the latter being of conventional type excepting that the sides thereof are bent in outwardly divergent relation to each other as at 30 at their lower portions so that the frame will properly rest upon the base 10 when placed within the roaster and this frame supports a slice of meat or the like and permits the convenient introduction thereof into the roaster between the units 17 and when the frame 29 containing a slice of meat or the like has been placed within the roaster on the operation of the latter both sides of the slice of meat will be roasted simultaneously.

The frame 29 carries side handles 31 and such sides are hinged at 32 together for the opening and closing of the frame for the reception of a slice of meat or the like therein or its removal therefrom, the handles 31 when brought together being latched through the medium of a latching loop 33, this being of conventional form.

The insulation 16 in the casing 12 avoids any possibility of short circuiting when the frame 29 is placed therein for the roasting operation of the roaster.

The tray or receptacle 22 with the cover 26 on removal thereof can be readily cleaned and the drippings or juice from the piece of meat or the like when being roasted can be discharged from the tray or receptacle 22 for the application to the roasted material or discarded according to the fancy of the user of the roaster.

It is of course understood that the roaster in its construction is designed primarily for roasting both sides of meat or the like when placed therein due to the opposed relation of the heating units therein, but such construction renders it adaptable for toasting or other cooking or heating purposes for edibles.

The roaster is smokeless when used in roasting meats or other edibles as the same are confined within the casing which is closed on all sides but the front thereof.

What is claimed is:—

A roaster of the character described comprising a base having supporting legs and an elongated opening longitudinally thereof in its top, a casing rising from the base and closed at its sides, top and rear with an open front and bottom, the open bottom registering with the elongated slot in the base, electric heating units arranged within the casing at opposite sides thereof and insulated therefrom and having an electric conductor for supplying electric current thereto, guides formed at the opposite longer edges of the elongated slot, a drip tray slidably fitted in the guide and closing the open bottom of the casing, and a perforated cover plate for said tray and removably supported over the open top thereof.

In testimony whereof I affix my signature.

JOSEPH JOHN BONACCORSI.